US011875675B2

(12) United States Patent
Yamamoto et al.

(10) Patent No.: US 11,875,675 B2
(45) Date of Patent: Jan. 16, 2024

(54) VEHICLE AND VEHICULAR DIAGNOSTIC SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 163 days.

(21) Appl. No.: 17/414,990

(22) PCT Filed: Dec. 27, 2019

(86) PCT No.: PCT/JP2019/051539
§ 371 (c)(1),
(2) Date: Jun. 17, 2021

(87) PCT Pub. No.: WO2020/138465
PCT Pub. Date: Jul. 2, 2020

(65) Prior Publication Data
US 2022/0068129 A1 Mar. 3, 2022

(30) Foreign Application Priority Data
Dec. 28, 2018 (JP) .................... 2018-248435

(51) Int. Cl.
*G05D 1/02* (2020.01)
*G01V 3/08* (2006.01)
(Continued)

(52) U.S. Cl.
CPC ............ *G08G 1/091* (2013.01); *B60W 40/12* (2013.01); *G01V 3/081* (2013.01); *G05D 1/0259* (2013.01); *B60W 2556/45* (2020.02)

(58) Field of Classification Search
CPC .... G08G 1/091; G08G 1/0112; G08G 1/0116; G08G 1/0129; G08G 1/0141;
(Continued)

(56) References Cited
U.S. PATENT DOCUMENTS 5,191,528 A * 3/1993 Yardley ................ G05D 1/0261
318/587
5,913,376 A * 6/1999 Takei .................... G05D 1/0274
701/26
(Continued)

FOREIGN PATENT DOCUMENTS

CN 101866017 A * 10/2010
CN 104036634 B * 4/2016
(Continued)

OTHER PUBLICATIONS

WO2018225677—Bibliographic data (Year: 2018).*
(Continued)

*Primary Examiner* — B M M Hannan
(74) *Attorney, Agent, or Firm* — Renner, Otto, Boisselle & Sklar, LLP

(57) ABSTRACT

A vehicle including a magnetic detecting part for detecting a magnetic marker disposed in a road is configured to acquire marker state information indicating the state of the magnetic marker from an external server apparatus via wireless communication and diagnose the state of the magnetic detecting part by using a result of detection of the magnetic marker in which the state of the magnetic marker indicated by the marker state information is good, thereby allowing inspection cost and cost of maintenance of the magnetic detecting part for detecting the magnetic marker to be suppressed.

20 Claims, 16 Drawing Sheets

(51) Int. Cl.
*G08G 1/09* (2006.01)
*B60W 40/12* (2012.01)

(58) Field of Classification Search
CPC .. G08G 1/042; B60W 40/12; B60W 2556/45; G01V 3/081; G05D 1/0259; G05D 2201/0213; G05D 1/0261; G01C 21/30
USPC .......................................................... 701/314
See application file for complete search history.

(56) References Cited

U.S. PATENT DOCUMENTS

| | | | | |
|---|---|---|---|---|
| 5,957,983 | A * | 9/1999 | Tominaga | B62D 1/28 |
| | | | | 701/41 |
| 6,122,573 | A | 9/2000 | Higashi | |
| 6,336,064 | B1 * | 1/2002 | Honkura | G01C 21/26 |
| | | | | 180/167 |
| 6,487,501 | B1 * | 11/2002 | Jeon | B62D 15/025 |
| | | | | 702/167 |
| 6,971,464 | B2 * | 12/2005 | Marino | G05D 1/0263 |
| | | | | 180/167 |
| 9,727,058 | B2 * | 8/2017 | Siebert | G05D 1/0261 |
| 2004/0046779 | A1 * | 3/2004 | Asano | G06Q 30/0601 |
| | | | | 715/716 |
| 2010/0141483 | A1 | 6/2010 | Thacher et al. | |
| 2011/0160949 | A1 * | 6/2011 | Kondo | G05D 1/0261 |
| | | | | 701/23 |
| 2014/0215320 | A1 * | 7/2014 | Fukuda | G06T 11/60 |
| | | | | 715/243 |
| 2014/0362989 | A1 * | 12/2014 | Chiesa | H04L 9/12 |
| | | | | 380/256 |
| 2015/0247719 | A1 * | 9/2015 | Huang | B62D 15/025 |
| | | | | 701/41 |
| 2016/0048732 | A1 * | 2/2016 | Matoba | G06V 20/20 |
| | | | | 345/633 |
| 2018/0039282 | A1 * | 2/2018 | Gupta | G06Q 10/04 |
| 2018/0157878 | A1 * | 6/2018 | Kovarik | E01F 9/30 |
| 2019/0155305 | A1 | 5/2019 | Aoyama | |
| 2019/0205580 | A1 * | 7/2019 | Kawana | G06F 16/00 |
| 2020/0133299 | A1 | 4/2020 | Yamamoto et al. | |

FOREIGN PATENT DOCUMENTS

| | | | | |
|---|---|---|---|---|
| EP | 2949534 | A2 * | 12/2015 | ......... B60G 17/0195 |
| ES | 2277422 | T3 * | 7/2007 | ............. G01N 33/52 |
| JP | H1083499 | A * | 3/1998 | |
| JP | 10132581 | A * | 5/1998 | |
| JP | 10-198887 | A | 7/1998 | |
| JP | 2000276691 | A * | 10/2000 | |
| JP | 2003157488 | A * | 5/2003 | |
| JP | 2003329465 | A * | 11/2003 | |
| JP | 2004-347443 | A | 12/2004 | |
| JP | 2005-202478 | A | 7/2005 | |
| JP | 2005234846 | A * | 9/2005 | |
| JP | 2007-132689 | A | 5/2007 | |
| JP | 2007132689 | A * | 5/2007 | |
| JP | 2007-303950 | A | 11/2007 | |
| JP | 2007303950 | A * | 11/2007 | |
| JP | 2012504269 | A * | 2/2012 | |
| JP | 2012059176 | A * | 3/2012 | |
| JP | 2018165856 | A * | 10/2018 | ............. G01V 3/081 |
| KR | 20110039624 | A | 4/2011 | |
| KR | 20160032398 | A * | 3/2016 | |
| WO | WO-2016104042 | A1 * | 6/2016 | ............. B60R 21/00 |
| WO | WO-2017175719 | A1 * | 10/2017 | ............. G01C 21/30 |
| WO | 2017/187879 | A1 | 11/2017 | |
| WO | WO-2017187881 | A1 * | 11/2017 | ............. E01F 11/00 |
| WO | WO-2017209112 | A1 * | 12/2017 | ............. G01C 21/04 |
| WO | WO-2017217423 | A1 * | 12/2017 | ............. E01F 11/00 |
| WO | WO-2018043267 | A1 * | 3/2018 | ............. G01C 21/28 |
| WO | WO-2018043273 | A1 * | 3/2018 | ............. B60W 30/12 |
| WO | WO-2018165856 | A1 * | 9/2018 | |
| WO | 2018/181053 | A1 | 10/2018 | |
| WO | WO-2018181050 | A1 * | 10/2018 | ............. G01V 3/081 |
| WO | WO-2018181052 | A1 * | 10/2018 | ............. E01C 23/18 |
| WO | 2018/225677 | A1 | 12/2018 | |

OTHER PUBLICATIONS

WO2017187881—Bibliographic data (Year: 2017).*
JP2016115207A.translate (Year: 2016).*
JP2012059176A.translate (Year: 2012).*
Extended European Search Report dated Jun. 27, 2022 corresponding to European Application No. 19902171.8.
International Search Report for corresponding Application No. PCT/JP2019/051539, dated Feb. 10, 2020.

* cited by examiner

[FIG.1]
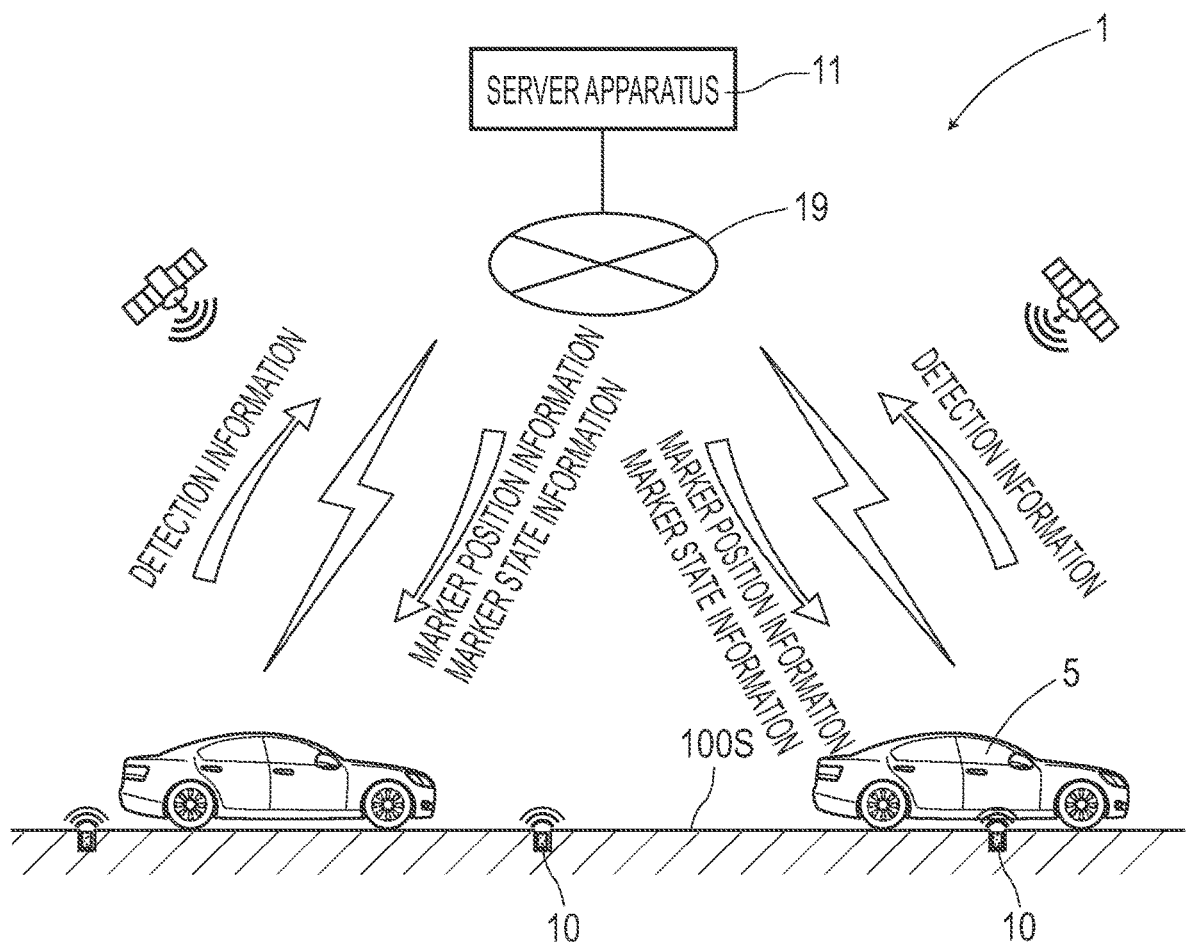

[FIG.2]
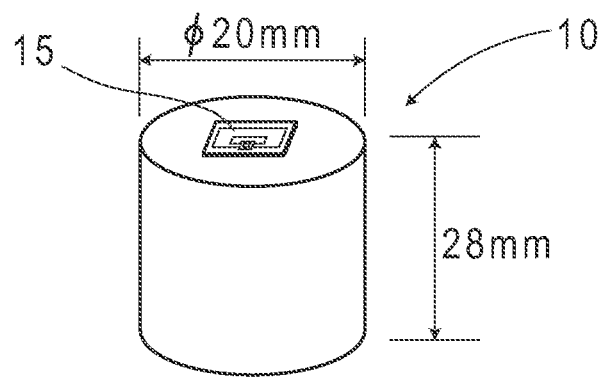

[FIG.3]
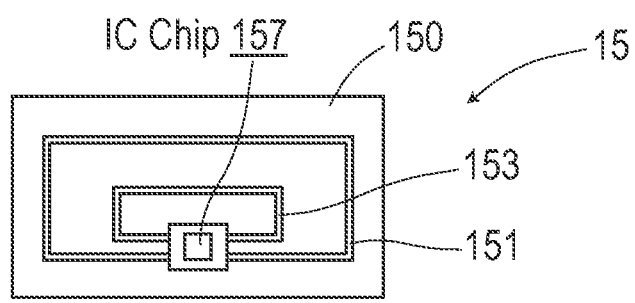

[FIG.4]
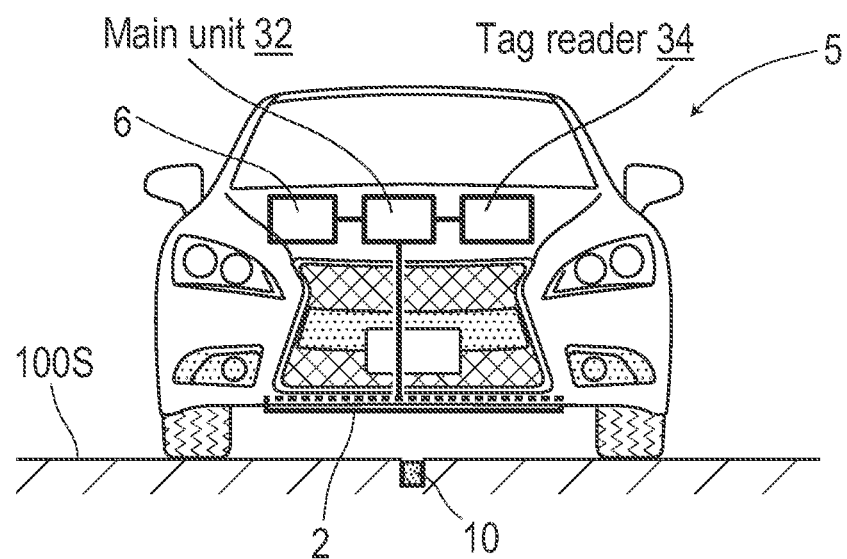

[FIG.5]
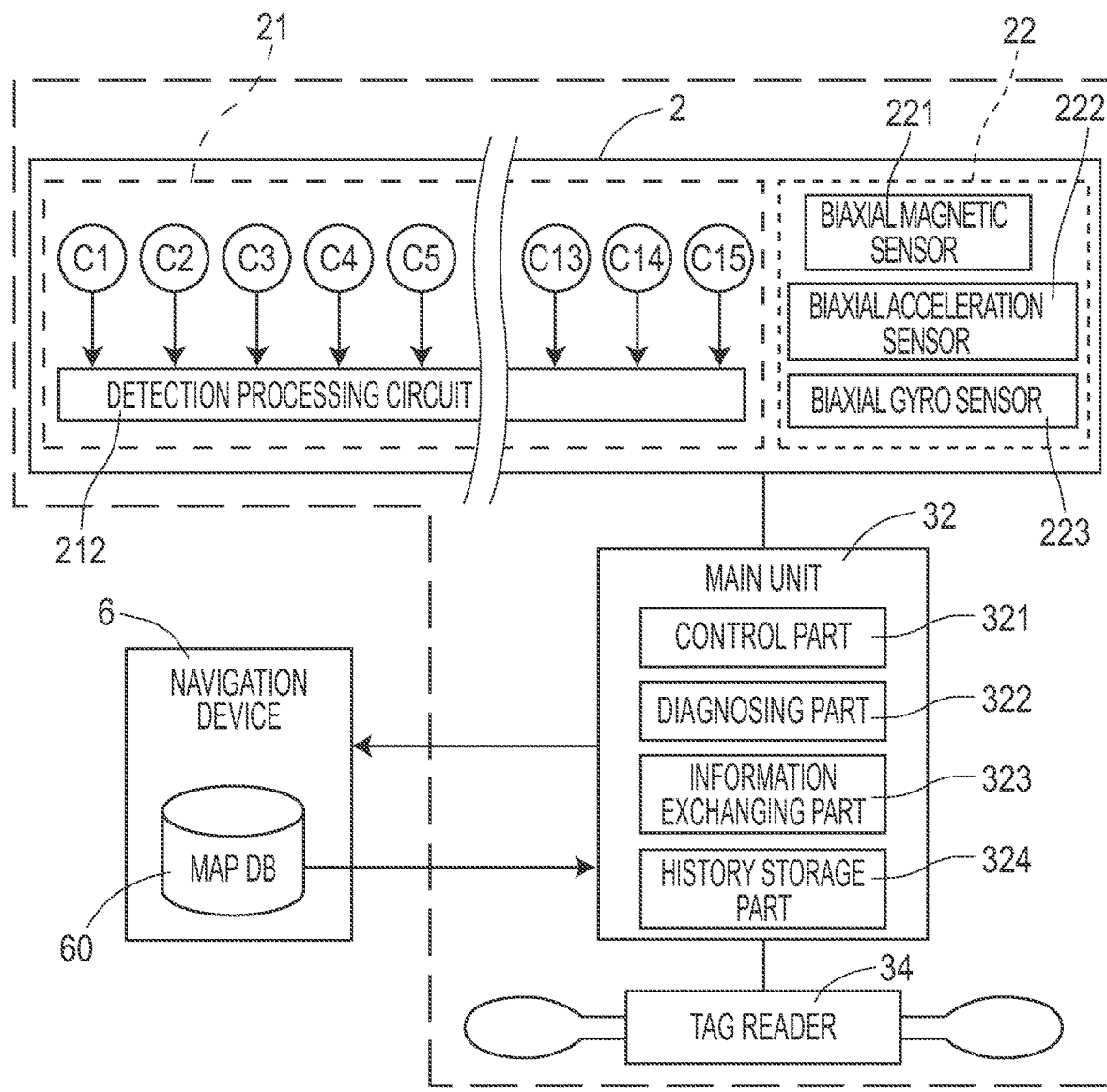

[FIG.6]
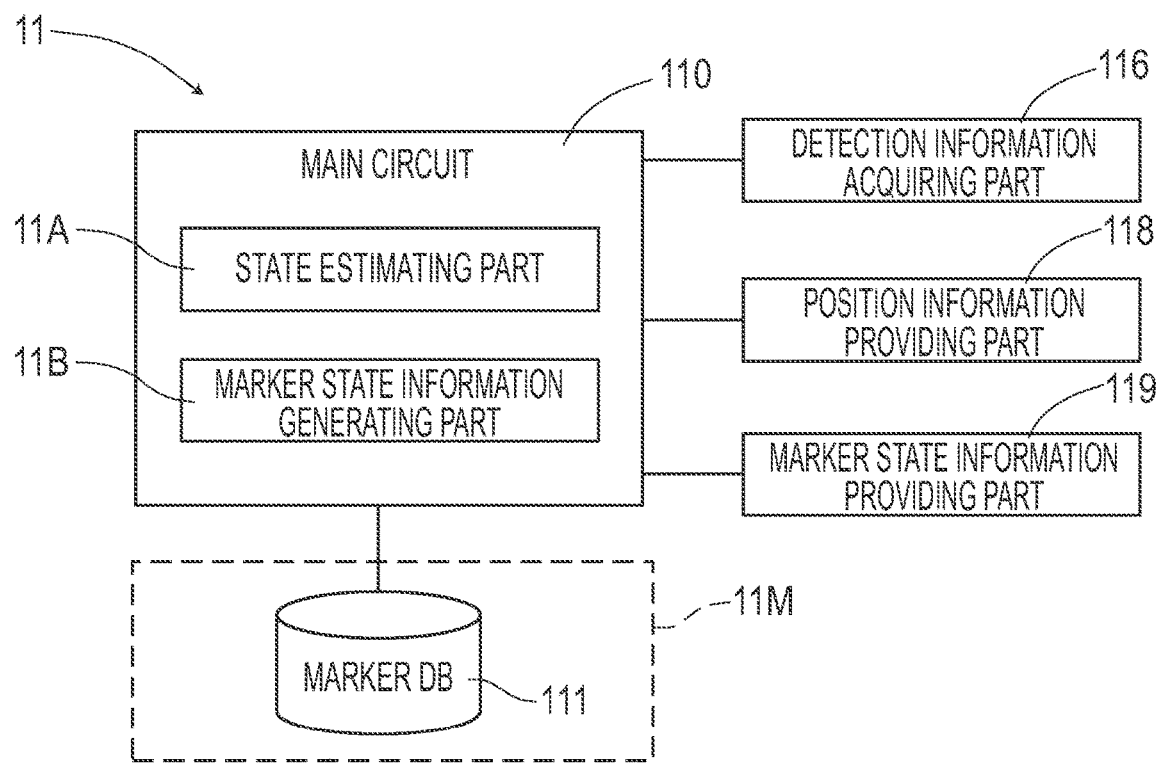

[FIG.7]

INSTALLATION DATA

| MARKER ID | MARKER POSITION DATA | ROAD TYPE |
|---|---|---|
| M3A32K | 35.3012/135.2513 | 1 |
| M2K70H | 35.2513/135.2614 | 2 |
| M5S91Y | 35.2515/135.2618 | 1 |
| M1R22N | 35.2410/135.2312 | 1 |
| M8L15G | 35.2426/135.2332 | 2 |
| M1S22W | 35.2328/135.2311 | 3 |
| M8B05H | 35.2433/135.2303 | 4 |
| ⋮ | ⋮ | ⋮ |

[FIG.8]

OPERATION DATA (MAGNETIC MARKERS)

ROAD TYPE 1 OCTOBER 26

| MARKER ID | MARKER-DETECTED COUNT |
|---|---|
| M3A32K | 102 |
| M2K70H | 103 |
| M5S91Y | 56 |
| M1R22N | 5 |
| M8L15G | 113 |
| M1S22W | 112 |
| M8B05H | 67 |
| ⋮ | ⋮ |

[FIG.9]

STATE DATA (MAGNETIC MARKERS)

| MARKER ID | QUALITY (MARKER STATE INFORMATION) |
|---|---|
| M3A32K | ○ |
| M2K70H | ○ |
| M5S91Y | △ |
| M1R22N | × |
| M8L15G | ○ |
| M1S22W | ○ |
| M8B05H | △ |
| ⋮ | ⋮ |

[FIG.10]
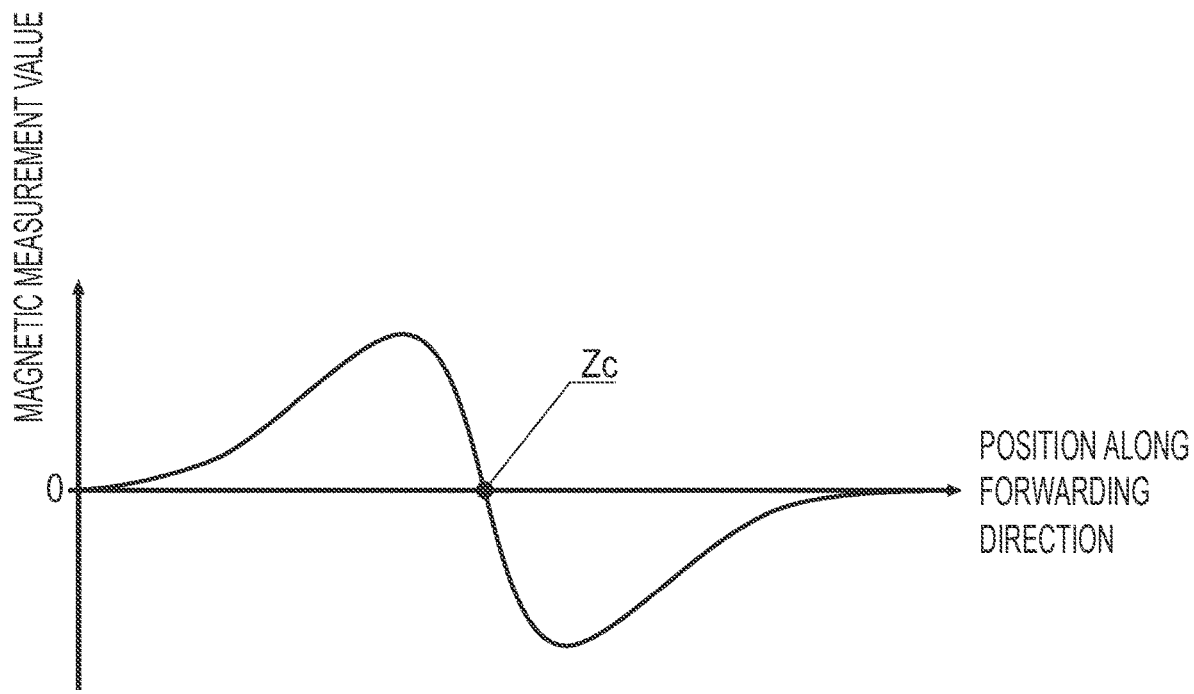

[FIG.11]
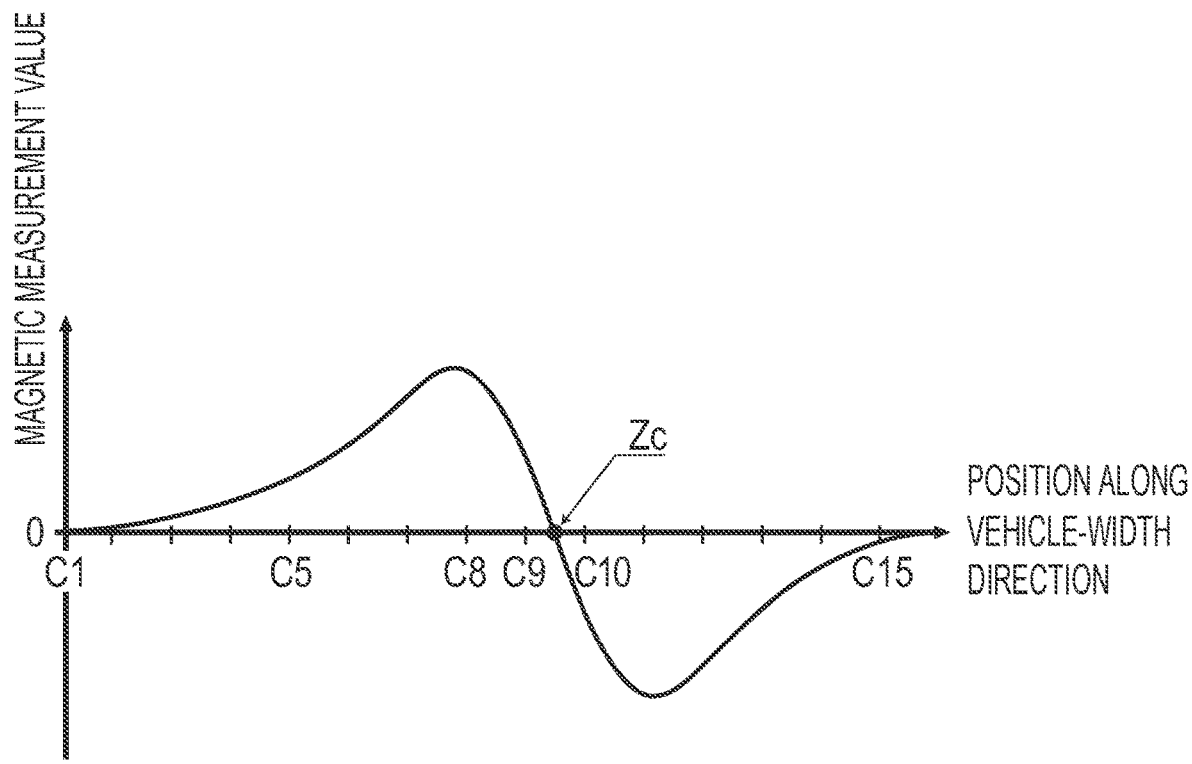

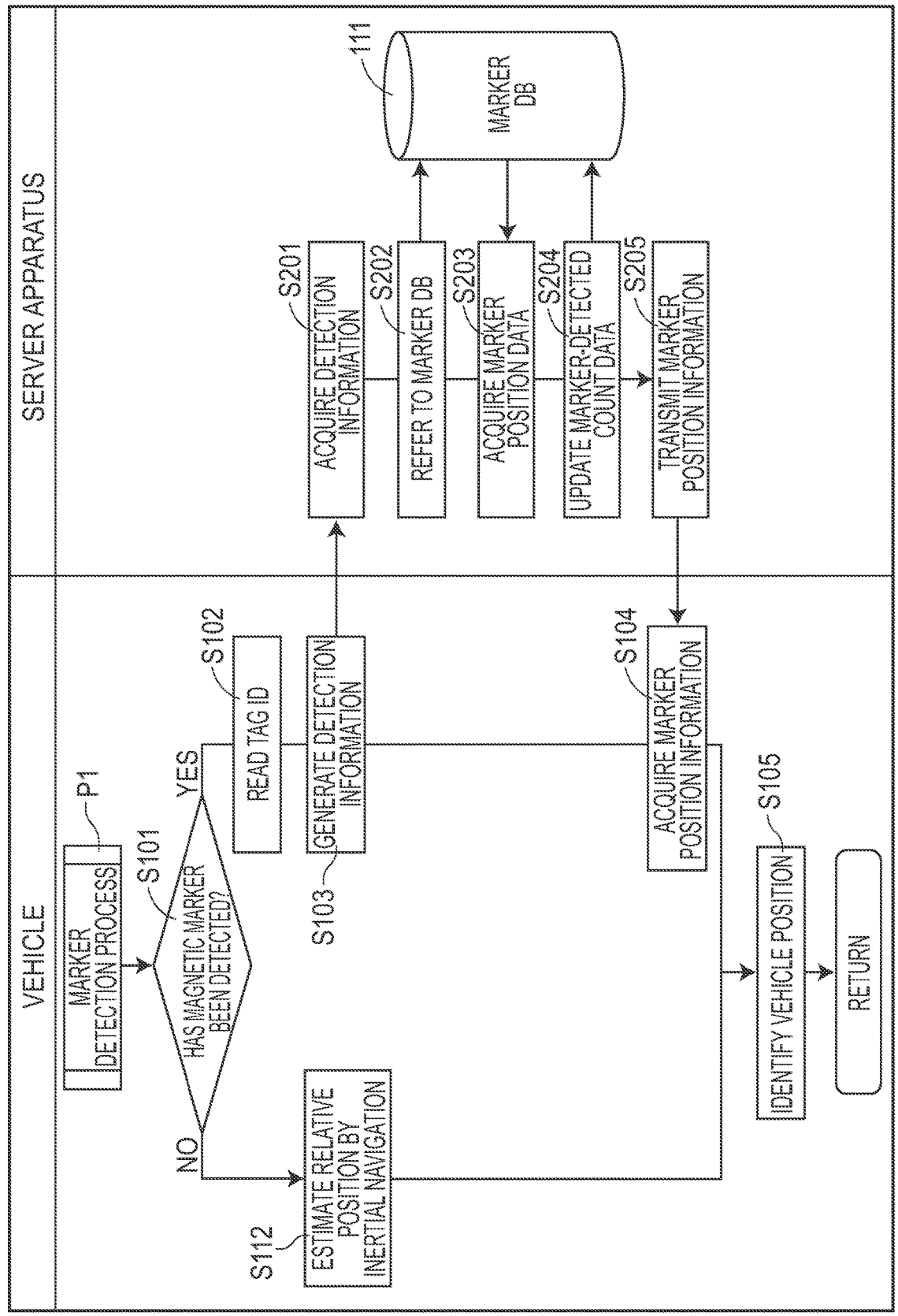

[FIG.13]
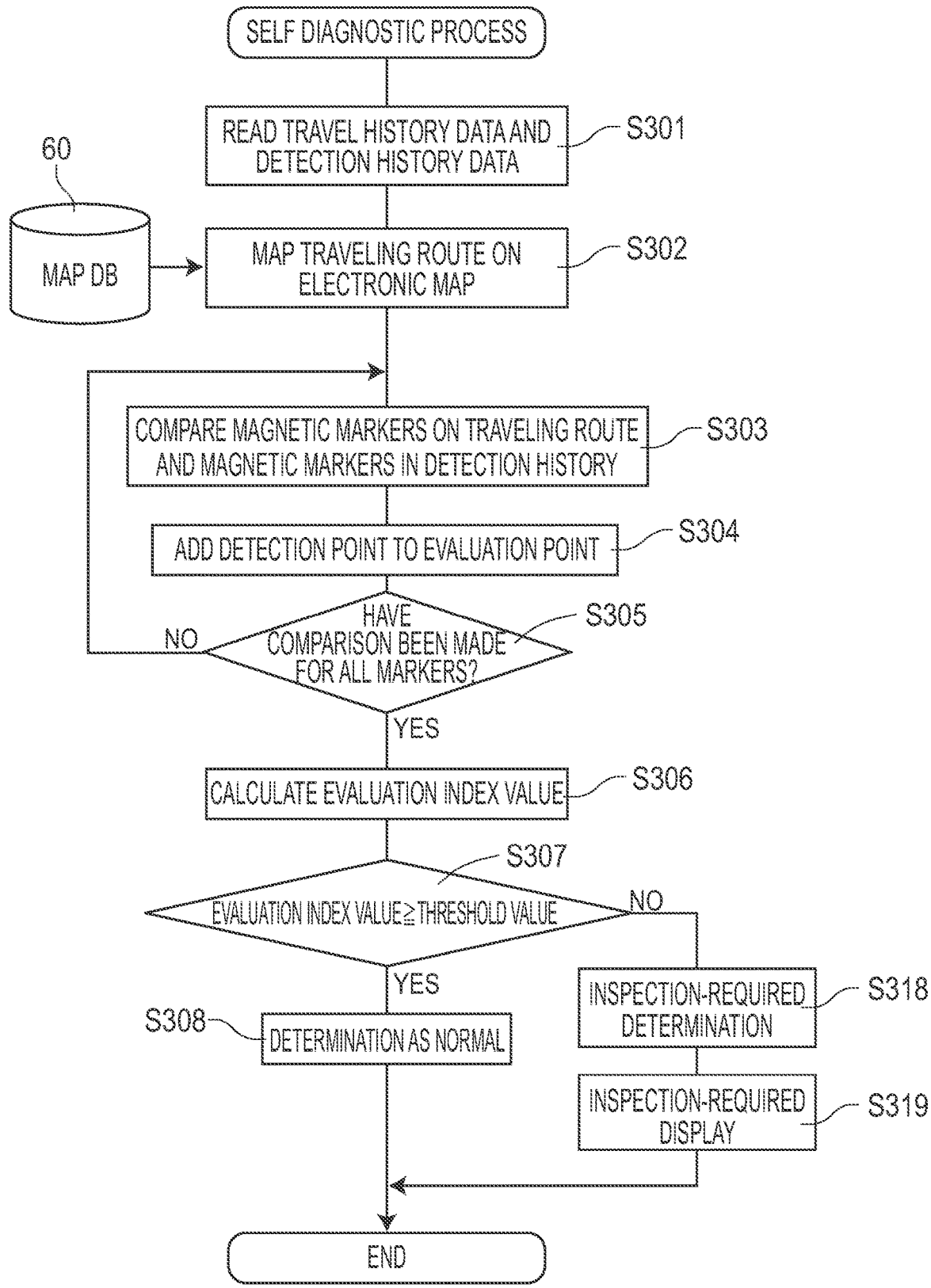

[FIG.14]
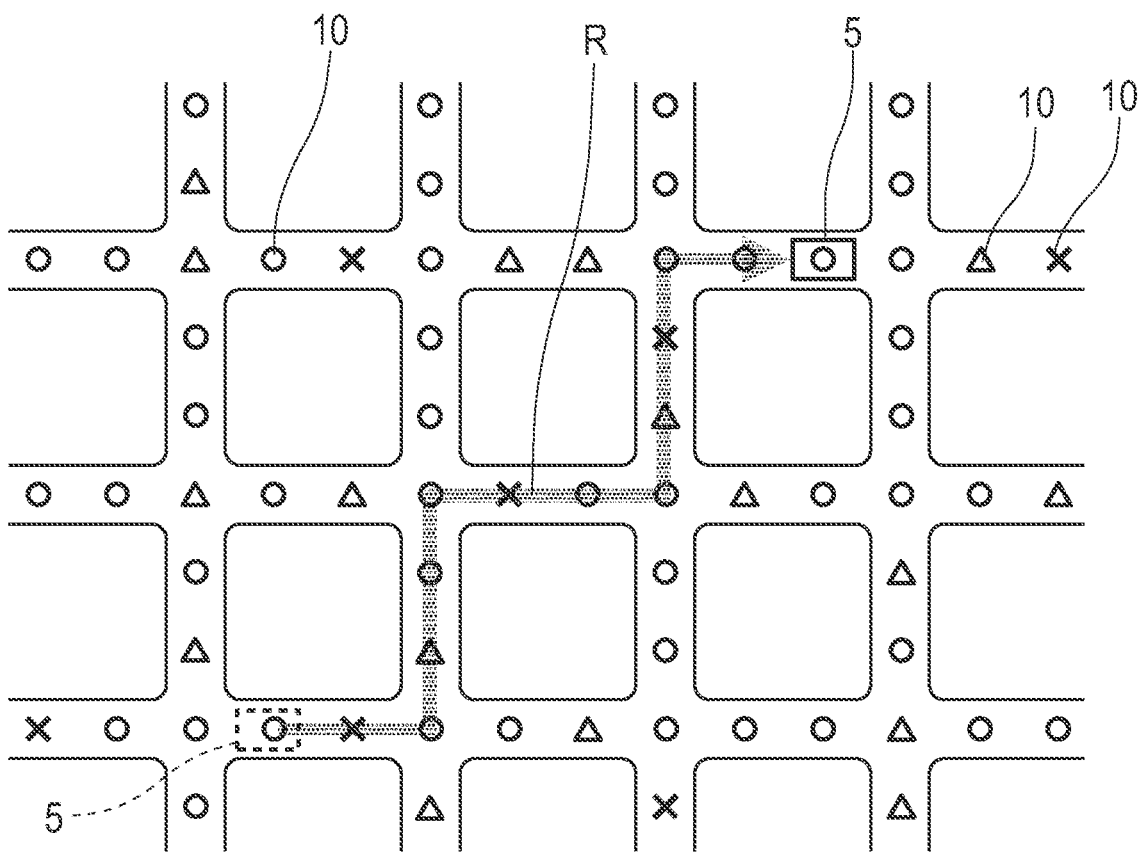

[FIG.15]

STATE DATA (MAGNETIC MARKERS)

| MARKER ID | QUALITY (MAINTENANCE INFORMATION) | MAGNETIC LEVEL |
|---|---|---|
| M3A32K | ○ | 10 |
| M2K70H | ○ | 5 |
| M5S91Y | △ | — |
| M1R22N | × | 8 |
| M8L15G | ○ | 7 |
| M1S22W | ○ | 8 |
| M8B05H | △ | 4 |
| ⋮ | ⋮ | ⋮ |

[FIG.16]
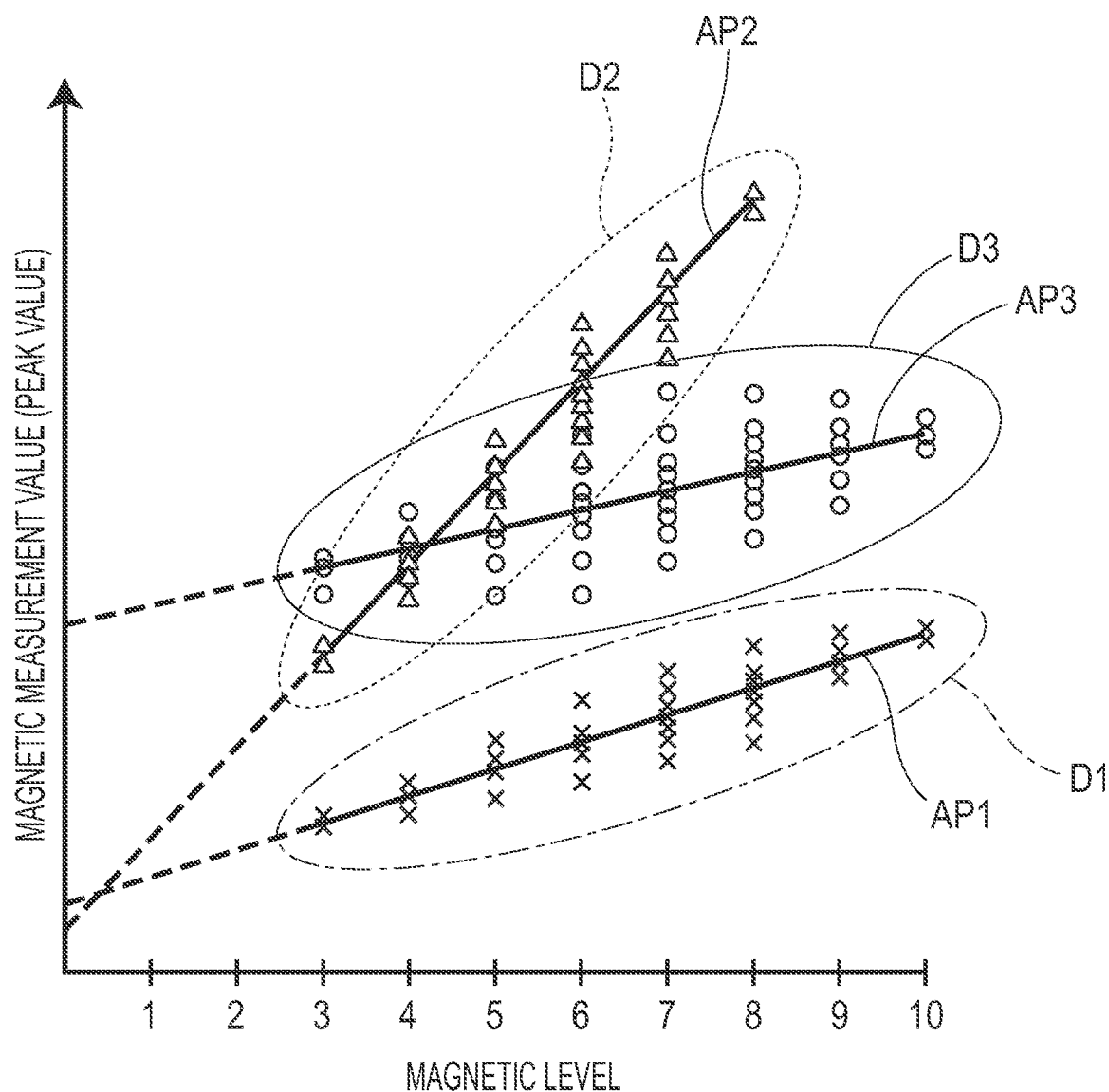

VEHICLE AND VEHICULAR DIAGNOSTIC SYSTEM

TECHNICAL FIELD

The present invention relates to a vehicle which detects a magnetic marker laid in a traveling road.

BACKGROUND ART

Conventionally, magnetic marker systems for vehicles using magnetic markers laid in a road have been known (for example, refer to Patent Literature 1). This magnetic marker system has an object of providing, by taking a vehicle with a magnetic sensor attached to a floor of the vehicle's body as a target, various driving assists using the magnetic markers laid along a lane, such as automatic steering control and lane departure warning.

CITATION LIST

Patent Literature

Patent Literature 1: Japanese Unexamined Patent Application Publication No. 2005-202478

SUMMARY OF INVENTION

Technical Problem

However, the above-described conventional system has the following problem. That is, regular inspection work and maintenance work are required in order to enable avoidance of a trouble that can happen in the magnetic sensor on a vehicle side before it happens, quick handling after the trouble occurs, and so forth, thereby raising a possibility of increasing upkeep cost.

The present invention was made in view of the above-described conventional problem, and is to provide a vehicle and a vehicular diagnostic system that can suppress cost of inspection and maintenance of a magnetic sensor on a vehicle side.

Solution to Problem

One mode of the present invention resides in a vehicle including a magnetic detecting part for detecting a magnetic marker disposed in a traveling road of the vehicle, the vehicle including a diagnosing part which diagnoses a state of the magnetic detecting part by using marker state information indicating a state of the magnetic marker.

One mode of the present invention resides in a vehicular diagnostic system including a plurality of vehicles each including a magnetic detecting part for detecting a plurality of magnetic markers disposed in a traveling road of the plurality of vehicles, the system including:

a server apparatus which acquires detection information of the plurality of magnetic markers by each of the plurality of vehicles and, based on the detection information, generates marker state information indicating a state of each of the plurality of magnetic markers, and the plurality of vehicles each including an acquiring part which acquires the marker state information from the server apparatus and a diagnosing part which diagnoses a state of the magnetic detecting part by using the marker state information.

Advantageous Effects of Invention

The vehicle according to the present invention diagnoses the state of the magnetic detecting part by using marker state information indicating the state of the magnetic marker. According to this vehicle, with self diagnosis of the state of the magnetic detecting part, cost of inspection and maintenance can be suppressed, and upkeep cost can be reduced.

BRIEF DESCRIPTION OF DRAWINGS

FIG. 1 is a configuration diagram of a magnetic marker system in a first embodiment.

FIG. 2 is a perspective view depicting a magnetic marker in the first embodiment.

FIG. 3 is a front view of an RFID tag in the first embodiment.

FIG. 4 is a descriptive diagram depicting a state in which a vehicle detects the magnetic marker in the first embodiment.

FIG. 5 is a block diagram depicting a configuration on a vehicle side in the first embodiment.

FIG. 6 is a block diagram depicting a configuration of a server apparatus in the first embodiment.

FIG. 7 is a descriptive diagram of installation data of magnetic markers in the first embodiment.

FIG. 8 is a descriptive diagram of operation data of the magnetic markers in the first embodiment.

FIG. 9 is a descriptive diagram of state data of the magnetic markers in the first embodiment.

FIG. 10 is a descriptive diagram exemplarily depicting changes of a magnetic measurement value in a forwarding direction at the time of passing over the magnetic marker in the first embodiment.

FIG. 11 is a descriptive diagram exemplarily depicting a distribution curve of magnetic measurement values in a vehicle-width direction by magnetic sensors Cn arrayed in the vehicle-width direction in the first embodiment.

FIG. 12 is a flow diagram depicting a flow of operation of a diagnostic system in the first embodiment.

FIG. 13 is a flow diagram depicting a flow of self diagnostic process in the first embodiment.

FIG. 14 is a descriptive diagram exemplarily depicting an electronic map mapped with the magnetic markers and a vehicle's route R in the first embodiment.

FIG. 15 is a descriptive diagram of state data of magnetic markers in a second embodiment.

FIG. 16 is a graph depicting a correlation between a magnetic level of a magnetic marker and a magnetic measurement value (peak value) from a magnetic sensor in the second embodiment.

DESCRIPTION OF EMBODIMENTS

Modes for implementation of the present invention are specifically described by using the following embodiments.

First Embodiment

The present embodiment is an example regarding vehicle 5 including a self diagnostic function of sensor array (magnetic detecting part) 21 for detecting magnetic marker 10, and vehicular diagnostic system 1. Vehicle 5 configuring this diagnostic system 1 diagnoses state of sensor array 21 by using marker state information distributed from server apparatus 11. Details of this are described by using FIG. 1 to FIG. 14.

Diagnostic system 1 of the present embodiment is configured of, as in FIG. 1, a combination of vehicles 5 that can detect magnetic marker 10 and server apparatus 11 which distributes marker state information indicating state of magnetic marker 10. This diagnostic system 1 is operated by taking a road (one example of a traveling road) where magnetic markers 10 which each integrally hold RFID (Radio Frequency IDentification) tag 15 (which will be described further below with reference to FIG. 3) are laid as a target.

In the following, after (1) magnetic marker 10 is generally described, (2) vehicle 5 and (3) server apparatus 11 configuring diagnostic system 1 are described, and then details of (4) operation of diagnostic system 1 are described.

(1) Magnetic Marker

Magnetic marker 10 is a road marker including, as in FIG. 2, a columnar-shaped magnet having a diameter of 20 mm and a height of 28 mm and having RFID tag 15 attached to its end face. This magnetic marker 10 is laid as, for example, being accommodated in a hole bored into a road surface. Magnetic markers 10 are arrayed, for example, at intervals of 10 meters along the center of a lane (one example of a traveling road) sectioned by left and right lane marks.

In magnetic marker 10, as in FIG. 2, sheet-shaped RFID tag 15 is laminated to the end face serving as an upper surface at the time of laying. RFID tag 15, which is one example of a wireless tag, operates by wireless external power feeding, and externally outputs, by wireless communication, a tag ID as unique identification information, or the like.

RFID tag 15 is, as in FIG. 3, an electronic component having IC chip 157 implemented on a surface of tag sheet 150 cut out from, for example, a PET (PolyEthylene Terephthalate) film. On the surface of tag sheet 150, a printed pattern of loop coil 151 and antenna 153 is provided. Loop coil 151 is a receiving coil where an exciting current is generated by external electromagnetic induction. Antenna 153 is a transmission antenna for wireless transmission of position data and so forth.

(2) Vehicle

Vehicle 5 includes, as in FIG. 4, measuring unit 2, tag reader 34, main unit 32, and a communication unit (omitted in the drawing) including a wireless communication function. Furthermore, vehicle 5 includes navigation device 6 which performs route guidance to a destination. Vehicle 5 can be connected to a public communication line via the communication unit. Vehicle 5 transmits and receives various information such as detection information, marker position information, and marker state information of magnetic marker 10 to and from server apparatus 11 via, for example, Internet 19 (FIG. 1).

Measuring unit 2 is, as in FIG. 4 and FIG. 5, a unit having sensor array (one example of the magnetic detecting part) 21 which detects magnetic marker 10 and IMU (Inertial Measurement Unit) 22 for achieving inertial navigation integrated together. Measuring unit 2 having a narrow rod shape is attached to, for example, the inside of the front bumper of vehicle 5 or the like, in a state of facing road surface 100S and along a vehicle-width direction. In the case of vehicle 5 of the present embodiment, attachment height of measuring unit 2 with reference to road surface 100S is 200 mm. Note that tag reader 34 may be integrally incorporated into measuring unit 2.

Sensor array 21 includes fifteen magnetic sensors Cn (n is an integer of 1 to 15, one example of the magnetic detecting part) arrayed on a straight line and detection processing circuit 212 having a CPU and so forth not depicted incorporated therein. In sensor array 21, fifteen magnetic sensors Cn are equidistantly arranged with 10-centimeter pitches. Magnetic sensors Cn are sensors which detect magnetism by using the known MI effect (Magneto Impedance Effect) in which impedance of a magneto-sensitive body such as an amorphous wire sensitively changes in response to an external magnetic field.

Detection processing circuit 212 (FIG. 5) of sensor array 21 is an arithmetic circuit which performs marker detection process for detecting magnetic marker 10, and so forth. This detection processing circuit 212 is configured by using a CPU (central processing unit) which performs various calculations as well as memory elements such as a ROM (read only memory) and a RAM (random access memory), and so forth. Detection processing circuit 212 acquires a sensor signal outputted from each of magnetic sensors Cn in a frequency of 3 kHz to perform the marker detection process, and then inputs the detection result to main unit 32.

IMU 22 incorporated in measuring unit 2 is an inertial navigation unit which estimates a relative position of vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity. Using the measured acceleration, the measured angular velocity, and so forth, IMU 22 calculates a relative position with respect to a vehicle position as a reference.

Tag reader 34 (FIG. 5) included in vehicle 5 is a unit which wirelessly communicates with RFID tag 15 (FIG. 3) arranged on a surface of magnetic marker 10. Tag reader 34 wirelessly transmits electric power required for operation of RFID tag 15, and receives information transmitted from RFID tag 15. Note that transmission information of RFID tag 15 includes the tag ID, which is identification information of RFID tag 15.

Main unit 32 (FIG. 5) included in vehicle 5 is a unit which includes, in addition to a function of controlling (control part 321) measuring unit 2 and tag reader 34 and a function of exchanging various information with server apparatus 11 (information exchanging part 323, which is one example of an acquiring part), the self diagnostic function of diagnosing sensor array (magnetic sensors Cn) 21. This self diagnostic function is implemented by diagnosing part 322 which diagnoses the state of sensor array 21, history storage part 324 which stores history data, and so forth. As the history data, there are detection history data indicating history of detection of magnetic markers 10, travel history data indicating a traveling route, which is a path through which vehicle 5 travels, and so forth.

Main unit 32 includes an electronic substrate (omitted in the drawing) having implemented thereon a CPU which performs various calculations, as well as memory elements such as a ROM and a RAM, and so forth. Main unit 32 uploads detection information of magnetic marker 10 to server apparatus 11 and, in response to uploading the detection information, receives a reply of marker position information from server apparatus 11. Furthermore, main unit 32 acquires marker state information indicating the state of each magnetic marker 10 from server apparatus 11. On a vehicle 5 side, by using this marker state information, self diagnosis of magnetic sensors Cn can be performed.

The detection information to be uploaded by main unit 32 includes a marker ID (marker identifying information) which can uniquely identify magnetic marker 10, a vehicle ID as vehicle's identification information, and so forth. Note in a configuration of the present embodiment that the tag ID read from RFID tag 15 when magnetic marker 10 is detected is used as it is as the marker ID (marker identifying information).

Main unit 32 (FIG. 5) identifies its own vehicle position by using the marker position information received from server apparatus 11. When magnetic marker 10 is detected, server apparatus 11 takes a position indicated by the marker position information as a reference and identifies a position shifted by a lateral shift amount of vehicle 5 with respect to magnetic marker 10 as its own vehicle position. On the other hand, after magnetic marker 10 is detected and until new magnetic marker 10 is detected, a new own vehicle position is identified by using inertial navigation. Specifically, server apparatus 11 estimates the relative position of vehicle 5 by inertial navigation by taking the most recent own vehicle position as a reference. Then, the server apparatus identifies a position shifted by this relative position from the most recent own vehicle position as the new own vehicle position. Main unit 32 inputs the own vehicle position to navigation device 6 which performs, for example, route guidance to the destination and so forth. Note that navigation device 6 has map database (map DB) 60 storing map data and can perform process of mapping (process of associating) its own vehicle position on an electronic map based on map data. The map data of map DB 60 includes marker position data indicating positions of magnetic markers 10.

Also, main unit 32 of the present embodiment can perform, based on the marker state information distributed from server apparatus 11, self diagnostic process of diagnosing the state of sensor array 21 and magnetic sensors Cn forming one example of the magnetic detecting part.

(3) Server Apparatus

Server apparatus 11 is, as in FIG. 6, an arithmetic processing apparatus having main circuit 110 which includes an electronic substrate, not depicted, having implemented thereon a CPU, and so forth. In server apparatus 11, storage device 11M such as a hard disk is connected to main circuit 110. Main circuit 110 includes a communication function supporting a LAN (Local Area Network) not depicted. Server apparatus 11 can be connected to the public communication line such as Internet 19 (FIG. 1) via a communication cable connected to a LAN port.

Connected to main circuit 110 are detection information acquiring part 116 which acquires detection information of magnetic marker 10 from vehicle 5, position information providing part 118 which provides marker position information to vehicle 5 as a transmission source of the detection information, marker state information providing part 119 which distributes marker state information to each vehicle 5, and so forth. Also, main circuit 110 includes functions such as state estimating part 11A which estimates the state of magnetic marker 10 and marker state information generating part 11B which generates marker state information indicating the state of magnetic marker 10. These functions are achieved by processing a software program by the CPU or the like.

Server apparatus 11 is provided with marker database (marker DB) 111 using a storage area of storage device 11M connected to main circuit 110 to store data regarding magnetic markers 10. Stored in marker DB 111 are installation data (FIG. 7) of magnetic markers 10, operation data (FIG. 8) of magnetic markers 10, state data (FIG. 9) of magnetic markers 10, and so forth.

The installation data of FIG. 7 includes marker position data indicating the position where each magnetic marker 10 is installed, flag data indicating a road type as a type of the road where it is installed, and so forth. To the marker position data or the like of each magnetic marker 10, the marker ID (marker identifying information), which is identification information of magnetic marker 10, is linked. Note that the road type of the present embodiment indicates a road classification based on the degree of volume of traffic. For example, magnetic markers 10 having the road type such as "road type 2" in common have a similar number of vehicles passing thereover.

The operation data of FIG. 8 is data indicating an operation status of each magnetic marker 10 such as a marker-detected count of magnetic marker 10, and has the marker ID linked thereto. The marker-detected count, which is an index indicating the operation status of magnetic marker 10, is the number of times when magnetic marker 10 is detected by any vehicle 5. This operation data is managed daily for each road type. For example, FIG. 8 depicts part of daily operation data regarding road type 1. Based on the operation data, a daily marker-detected count of each magnetic marker 10 can be grasped. Furthermore, since the operation data is managed for each road type, statistical process on the marker-detected count of magnetic marker 10 can be performed for each road type.

The state data of FIG. 9 is flag data indicating a quality level (one example of a state) of magnetic marker 10. To this state data, the marker ID is linked. In the example of FIG. 9, as flag data indicating a quality level of magnetic marker 10, three types of data are presented, for example, corresponding to a circle, a triangle, and a cross. The circle represents flag data indicating a good state with a low degree of possibility of trouble. The cross represents flag data with a high possibility of trouble, indicating that maintenance work is required. The triangle represents flag data indicating that maintenance work is not immediately required to be performed but there is a possibility of trouble and monitoring is required. The state data of FIG. 9 can be used as original data of maintenance information indicating whether to require maintenance work on each magnetic marker 10. Also, the state data of the drawing can be used as marker state information indicating the state of each magnetic marker 10.

(4) Operation of Diagnostic System

As for details of operation of diagnostic system 1 configured as described above, first, with reference to FIG. 10 and FIG. 11, (a) marker detection process by vehicle 5 is described. Subsequently, with reference to the flow diagram of FIG. 12, (b) detection information uploading process by vehicle 5 and (c) marker position information distribution process by server apparatus 11 are descried. Furthermore, (d) marker state information generation process by server apparatus 11 is described and, subsequently, with reference to FIG. 13 and FIG. 14, (e) self diagnostic process by the vehicle is described.

(a) Marker Detection Process

While vehicle 5 is traveling on the road, sensor array 21 (FIG. 5) of measuring unit 2 repeatedly performs marker detection process for detecting magnetic marker 10.

As described above, magnetic sensors Cn can measure magnetic components in a forwarding direction and the vehicle-width direction of vehicle 5. For example, when these magnetic sensors Cn move in the forwarding direction to pass directly above magnetic marker 10, magnetic measurement value in the forwarding direction has its sign reversed before and after passing magnetic marker 10 as in FIG. 10 and changes so as to cross zero at a position directly above magnetic marker 10. Therefore, during traveling of vehicle 5, when zero-cross Zc occurs in which the sign of the magnetic measurement value in the forwarding direction detected by any magnetic sensor Cn is reversed, it can be determined that measuring unit 2 is positioned directly above magnetic marker 10. Detection processing circuit 212 (FIG. 5) determines that magnetic marker 10 is detected when, as described above, measurement unit 2 is positioned directly above magnetic marker 10 and zero-cross Zc of the magnetic measurement value in the forwarding direction occurs.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at the position directly above magnetic marker 10. In the case of measuring unit 2 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10, as in the example of FIG. 11.

Based on a distribution curve of FIG. 11 exemplarily depicting magnetic measurement values in the vehicle-width direction of respective magnetic sensors Cn of measuring unit 2, it is possible to identify the position of magnetic marker 10 in the vehicle-width direction by using zero-cross Zc where the sign of the magnetic measurement value in the vehicle-width direction is reversed. When zero-cross Zc is positioned at an intermediate position (that is not limited to the center) between adjacent two magnetic sensors Cn, the intermediate position between the adjacent two magnetic sensors Cn across zero-cross Zc is the position of magnetic marker 10 in the vehicle-width direction. Alternatively, when zero-cross Zc matches the position of any magnetic sensor Cn, that is, when magnetic sensor Cn is present where the magnetic measurement value in the vehicle-width direction is zero and the signs of the magnetic measurement value of magnetic sensor Cn on both outer sides are reversed, a position directly below that magnetic sensor Cn is the position of magnetic marker 10 in the vehicle-width direction. Detection processing circuit 212 measures a deviation of the position of magnetic marker 10 in the vehicle-width direction with respect to the center position (position of magnetic sensor C8) of measuring unit 2 as the lateral shift amount of vehicle 5 with respect to magnetic marker 10. For example, in the case of FIG. 11, the position of zero-cross Zc is a position corresponding to C9.5 in the neighborhood of a midpoint between C9 and C10. As described above, since the pitch between magnetic sensors C9 and C10 is 10 cm, the lateral shift amount of vehicle 5 with respect to magnetic marker 10 is (9.5-8)×10=15 cm with reference to C8 positioned at the center of measuring unit 2 in the vehicle-width direction.

(b) Detection Information Uploading Process

As in FIG. 12, when sensor array 21 of vehicle 5 performs marker detection process P1 described above and detects magnetic marker 10 (S101: YES), tag reader 34 performs tag ID reading process for reading the tag ID of RFID tag 15 (S102). Tag reader 34 wirelessly transmits electric power required for operation of RFID tag 15 to start operation of RFID tag 15, and receives transmission data (such as the tag ID) of RFID tag 15. Then, tag reader 34 inputs the tag ID read by this tag ID reading process to main unit 32. Main unit 32 handles this tag ID as the marker ID as marker identifying information, and generates detection information including this marker ID (S103). Then, the vehicle ID as identification information of vehicle 5 is linked to the detection information and main unit 32 transmits the detection information to server apparatus 11.

(c) Marker Position Information Distribution Process

Server apparatus 11, as in FIG. 12, when acquiring the detection information from the vehicle 5 side (S201), refers to marker DB 111 (FIG. 6) which stores the marker position data of each magnetic marker 10 and so forth (S202) and then, from the inside of marker DB 111, selects magnetic marker 10 corresponding to the detection information, that is, magnetic marker 10 regarding the marker ID of the detection information.

Server apparatus 11 refers to the installation data (FIG. 7) in marker DB 111 and acquires the marker position data and so forth of the selected magnetic marker 10 (S203) and, furthermore, refers to the operation data (FIG. 8) in marker DB 111 and increments the marker-detected count (refer to FIG. 8) of the selected magnetic marker 10 by one (S204). Then, the server apparatus generates marker position information including the marker position data acquired at step S203, and transmits the marker position information to vehicle 5 as a transmission source of the detection information acquired at step S201 described above (S205).

Main unit 32 of vehicle 5, when acquiring the marker position information (S104), identifies the vehicle position by taking the position indicated by this marker position information as a reference (S105). Specifically, the main unit performs calculation of shifting from the position of magnetic marker 10 as a reference by the lateral shift amount (one example of the relative position) measured by measuring unit 2 in a manner as described above and obtains the vehicle position. Navigation device 6 handles this vehicle position as the own vehicle position and performs route guidance and so forth.

Note that in a traveling section after magnetic marker 10 is detected and until new magnetic marker 10 is detected (S101: NO), main unit 32 estimates the relative position of vehicle 5 by inertial navigation by taking the vehicle position at the time of most recent magnetic marker detection as a reference position (S112). Specifically, IMU 22 (FIG. 5) incorporated in measuring unit 2 calculates a displacement amount by double integration of acceleration measured by biaxial acceleration sensor 222 and performs calculation of integrating displacement amounts along a forwarding azimuth of vehicle 5 measured by biaxial gyro sensor 223. With this, the relative position of vehicle 5 with reference to the above-described reference position is estimated. Then, a position obtained by moving by this relative position from the reference position is identified as the own vehicle position (S105).

(d) Marker State Information Generation Process

Server apparatus 11 performs statistical process for calculating an average value, a standard deviation, or the like as for the marker-detected count of each magnetic marker 10 (operation data of FIG. 8). Note in a configuration of the present embodiment that reliability of the statistical process is ensured by performing statistical process for each road type with the same degree of the volume of traffic.

For each magnetic marker 10, server apparatus 11 calculates a deviation value of the marker-detected count and performs threshold process regarding this deviation value. For example, for magnetic marker 10 with its deviation value of the marker-detected count is below a predetermined threshold value, server apparatus 11 determines that the possibility of trouble is high. In this manner, server apparatus 11 generates state data (FIG. 9) indicating the state of each magnetic marker 10. This state data is quality information indicating the quality level of each magnetic marker 10. This state data can be used as original data of maintenance information indicating whether to require maintenance work on each magnetic marker 10 and marker state information indicating the state of each magnetic marker 10. Note in the present embodiment that, as in FIG. 9, two-stage threshold values are set for the deviation value of the marker-detected count described above. And, with the two-stage threshold values, the quality levels of magnetic marker 10 are classified into three stages (circle, triangle, and cross in the drawing).

The state data of FIG. 9 can be used directly as maintenance information. According to the maintenance information based on the state data, it is possible to perform maintenance of magnetic markers 10 by, for example, a road administrator or the like at appropriate timing. For example, as for a magnetic marker with the cross, a determination can be made such as that in which the magnetic marker has a possibility of trouble and urgent maintenance is required. For example, as for a magnetic marker with the triangle, a determination can be made such as that in which maintenance is required in the next few days. Note that the state data of FIG. 9 may be processed. For example, as for magnetic marker 10 with its quality indicated by the circle, it is possible, for example, as maintenance information, to convert or process the state data to character information such as "a good state is being kept". Also, for example, as for magnetic marker 10 with its quality indicated by the cross, it is possible, for example, to convert or process the state data to maintenance information such as "immediate inspection is required".

(e) Self Diagnostic Process by Vehicle

Server apparatus 11 regularly distributes, as marker state information indicating the state of magnetic markers 10, the state data of FIG. 9 to each vehicle 5. On the vehicle 5 side, by using the marker state information acquired from server apparatus 11, self diagnostic process of sensor array (magnetic sensors Cn) 21 is performed. Next, details of this self diagnostic process are described with reference to the flow diagram of FIG. 13.

Main unit 32 first reads, from a storage area of history storage part 324 (FIG. 5), travel history data and detection history data (S301). As described above, the travel history data is data indicating the traveling route of vehicle 5. The detection history data is a history of magnetic markers 10 detected by vehicle 5 during traveling. Each magnetic marker 10 in the detection history data is identified with the marker ID, which is marker identifying information.

Main unit 32 reads, from map DB 60 of the navigation device, map data corresponding to the traveling route of the vehicle. Here, the map data of map DB 60 includes marker position data indicating the positions of magnetic markers 10. By using this marker position data, main unit 32 maps the position of each magnetic marker 10 on the electronic map based on the map data (FIG. 14).

Main unit 32 maps traveling route R of vehicle 5 based on the travel history data on the electronic map mapped with the position of each magnetic marker 10 (S302, FIG. 14). Then, magnetic markers 10 on the traveling route R of vehicle 5 are identified. Note in FIG. 14 that the position of each magnetic marker 10 is indicated by a plot type (the circle, the triangle, the cross) representing the quality level based on the marker state information distributed from server apparatus 11 (FIG. 1).

Main unit 32 performs process of comparing magnetic markers on the traveling route R (referred to as route markers) and magnetic markers in the detection history data (referred to as history markers) (S303). In this comparison process, of the above-described route markers, a route marker matching a corresponding history marker of the above-described history markers is converted to a detection point for scoring and added to an evaluation point (S304). Note that the point number of the detection point differs in accordance with the quality level of magnetic marker 10. For example, a magnetic marker with the quality level indicated by the circle has 1 point, a magnetic marker with the triangle has 2 points, and a magnetic marker with the cross has zero point. In this manner, in a configuration of the present embodiment, in accordance with the quality level of the state of magnetic marker 10, degree of reflection onto an index (for example, evaluation point, evaluation index value, which will be described further below, or the like) for use in diagnosis of sensor array 21 varies.

Main unit 32 performs the comparison process at the above-described steps S303→S304 for all route markers (S305: NO). Note that as for remaining magnetic markers 10 of the history markers that have not been able to be compared with corresponding route markers are treated as erroneously-detected magnetic markers 10, and detection points of minus 3 points are added to the evaluation point.

Main unit 32 divides the above-described evaluation point by the number of magnetic markers 10 of the route markers with the quality level indicated by the circle or the triangle to calculate an evaluation index value (S306), and performs threshold process (S307). As a threshold value for this threshold process, for example, 1 point, 1.5 points, 2 point, or the like can be set.

When the evaluation index value is equal to or larger than the threshold value (S307: YES), main unit 32 determines that sensor array 21 is normal (S308). On the other hand, the evaluation index value is under the threshold value (S307: NO), it is determined that the state is such that inspection of sensor array 21 is required (S318, inspection-required determination), and notification as such is performed by displaying by a liquid-crystal display of the vehicle's interior or the like (S319, inspection-required display). With this notification, counter measures on a user side can be taken such as carrying the vehicle into a repair shop or the like, thereby allowing early counter measures before a critical trouble happens.

As described above, vehicle 5 in diagnostic system 1 of the present embodiment can perform self diagnosis of the state of sensor array 21 by using the marker state information indicating the state of magnetic marker 10. In this vehicle 5, since self diagnosis of the state of sensor array 21 can be performed, cost of inspection and maintenance can be suppressed, and upkeep cost can be reduced.

In the present embodiment, the configuration is exemplarily described in which the detection information of magnetic markers 10 is collected from general vehicle 5 and server apparatus 11 generates marker state information. In place of this configuration, an inspection vehicle may be caused to travel to collect detection information of magnetic markers 10 and server apparatus 11 may generate marker state information based on this detection information. In the case of this configuration, server apparatus 11 can generate marker state information even without acquiring the detection information uploaded by the general vehicle. For example, if this marker state information is distributed to each vehicle, self diagnosis of sensor array 21 on the vehicle side can be performed.

Note in the present embodiment that the configuration is exemplarily described in which server apparatus 11 generates state data of the magnetic markers by statistical process.

The method of generating state data of the magnetic markers can be changed as appropriate.

Second Embodiment

The present embodiment is an example in which, based on diagnostic system of the first embodiment, a function of diagnosing a change in ground clearance of a vehicle is added. Details of this are described with reference to FIG. 15 and FIG. 16.

In a diagnostic system of the present embodiment, a magnetic measurement value (peak value) when a magnetic marker is detected is added to detection information uploaded by the vehicle. To evaluate the quality of the magnetic marker, a server apparatus of the present embodiment evaluates the degree of magnetic intensity of the magnetic marker with ten-stage magnetic levels. The server apparatus calculates an average value of magnetic measurement values (peak values) included in the detection information acquired from each vehicle side, and allocates magnitude of that average value to any of ten-stage magnetic levels (refer to FIG. 15). This magnetic level is distributed to each vehicle as part of the marker state information of the magnetic marker, together with information about a quality level (circle, triangle, cross).

For example, on the vehicle side receiving distribution of the marker state information based on the state data of FIG. 15, in addition to diagnosis similar to that of the first embodiment regarding the state of the magnetic sensor, self diagnostic process of diagnosing the change in ground clearance of the vehicle is performed. Diagnosis of the change in ground clearance of the vehicle is diagnosis of detecting the change in ground clearance of the vehicle by using an index value indicating a correlation between the magnetic level of the magnetic marker and the magnetic measurement value (peak value) of the magnetic sensor.

Details of the process internally performed by the diagnosing part (reference sign 322 in FIG. 5) of the vehicle can be described by using, for example, the graph of FIG. 16. The graph of the drawing represents a relation between the magnetic measurement value (peak value) when a target vehicle detects a magnetic marker and the magnetic level of that magnetic marker (refer to FIG. 15). The horizontal axis of the graph of the drawing represents ten-stage magnetic levels (marker state information) of the magnetic markers, and the vertical axis represents magnetic measurement values (peak values). On the graph of FIG. 16, pieces of detection information uploaded by the target vehicle are sequentially plotted. Diagnosing part of the vehicle calculates, for a plotted point group, an approximate straight line by, for example, the least square method. Then, a gradient (coefficient) or an intercept of this approximate straight line can become the index value indicating the above-described correlation. Note that the intercept is the value at a point where the approximate straight line and the vertical axis cross.

The Diagnosing part sets a predetermined time, for example, one hour, two hours, one day, one week, or the like, and calculates approximate straight lines (for example, AP1 to AP3) of plotted point groups (for example, D1 to D3) for each predetermined time. For example, when the predetermined time is one hour, the approximate straight line is calculated for every one hour. For example, if sensitivity of magnetic sensors (magnetic detecting part) of the sensor array is not changed and mount height of the sensor array is not changed, the gradient and the intercept of the above-described approximate straight lines (for example, AP1 to AP3) are approximately constant with time. On the other hand, if the sensitivity of the magnetic sensors is not changed but a change occurs in the mount height of the sensor array, the gradient and so forth of the above-described approximate straight lines are changed with time.

With this temporal change being detected, the diagnosing part can detect the change in ground clearance of the vehicle. With the change in ground clearance of the vehicle being detected, the diagnosing part can detect, for example, a flat tire, overloading of loads, or the like, which is a cause for the change in ground clearance of the vehicle. When threshold process is performed regarding temporal changes of the gradient and so forth of the above-described approximate straight lines and a change exceeding a threshold value occurs, server apparatus 11 may generate vehicle information indicating that the change in ground clearance of the vehicle is large. In this case, server apparatus 11 may transmit this vehicle information to a corresponding vehicle to encourage caution. For example, if the vehicle information is presented to a passenger by using a display device, a loudspeaker, or the like, an occurrence of an accident due to the flat tire or overloading of loads can be prevented before it happens.

For example, a case in which a transition is made from point group D1→point group D2 is a case in which a change of the intercept hardly occurs but the gradient of the approximate straight line increases. In this case, the cause can be assumed such that the ground clearance of the vehicle is lowered due to, for example, overloading, the flat tire, or the like. With the ground clearance of the vehicle lowered, the mount height of the sensor array (magnetic sensors) is lowered, thereby increasing the magnetic measurement value (peak value) when the sensor array (magnetic sensors) detects the magnetic marker.

When the change in ground clearance of the vehicle is detected, in addition to or in place of notifying the passenger, there is a method of transmitting vehicle information to a terminal device of a vehicle's dealer which carries out maintenance of the vehicle or the like by using a public communication line such as the Internet, or the like. Furthermore, when the vehicle is a business vehicle such as a taxi or a truck, the vehicle information may be transmitted to a terminal device of a responsible section of an enterprise or a company which manages the business vehicle.

For example, a case in which a transition is made from point group D1→point group D3 is a case in which a change of the gradient of the approximate straight line is less but the intercept has been changed in a manner such that approximate straight line AP1 makes an upward translational movement to become approximate straight line AP3. In this case, there is a possibility that the sensitivity of the magnetic sensors has been changed and also there is a possibility that a change has occurred in the ground clearance of the vehicle. As with the case in which a transition is made from point group D1→point group D2, vehicle information such that there is the possibility that the change has occurred in the ground clearance of the vehicle is preferably presented to the passenger.

Note that a relation between a change in gradient and intercept of an approximate straight line of a point group or a change in distribution mode of the point group and a cause of occurrence may be subjected to machine learning or the like. According to this machine learning, the cause of occurrence can be estimated by an artificial-intelligence-like scheme. In this case, vehicle information indicating the cause of occurrence is preferably provided to the vehicle side.

Note that other configurations and operations and effects are similar to those of the first embodiment.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes technology acquired by variously modifying, changing, or combining as appropriate the above-described specific examples by using known techniques, knowledge of a person skilled in the art, and so forth.

REFERENCE SIGNS LIST 1 diagnostic system
10 magnetic marker
11 server apparatus
11A state estimating part
11B marker state information generating part
11M storage device
111 marker database (marker DB)
116 detection information acquiring part
118 position information providing part
119 marker state information providing part
15 RFID tag (wireless tag)
2 measuring unit
21 sensor array (magnetic detecting part)
212 detection processing circuit
32 main unit
322 diagnosing part
323 information exchanging part (acquiring part)
34 tag reader
5 vehicle
6 navigation apparatus

The invention claimed is:

1. A vehicle including a magnetic sensor for detecting a magnetic marker disposed in a traveling road of the vehicle, the vehicle comprising:
 a computer processor configured to diagnose a state of the magnetic sensor by using marker state information to determine whether the magnetic sensor is normal or whether an inspection of the magnetic sensor is required,
 wherein the marker state information is quality information indicating a quality level of the magnetic marker; and
 a tag reader configured to perform wireless communication with a wireless tag held by the magnetic marker and acquire marker identifying information for identifying a corresponding magnetic marker from the wireless tag,
 wherein the computer processor is further configured to identify the marker state information of the corresponding magnetic marker by using the marker identifying information acquired from a magnetic marker side.

2. The vehicle in claim 1, further comprising a communication interface which acquires the marker state information which is the quality information indicating the quality level of the magnetic marker from an external server apparatus via wireless communication.

3. The vehicle in claim 1, wherein:
 the computer processor is configured to diagnose a change in ground clearance of the vehicle in accordance with a change in mount height of the magnetic sensor in the vehicle,
 the marker state information includes information indicating a magnetic level of the magnetic marker, and
 the computer processor performs diagnosis of detecting the change in ground clearance of the vehicle by using an index value indicating a correlation between the magnetic level of the magnetic marker included in the marker state information and a peak value of a magnetic measurement value measured by the magnetic sensor for the magnetic marker, and
 the index value indicating the correlation is a gradient of an approximate straight line of the correlation, and the computer processor performs a threshold process regarding temporal changes of the gradient of the approximate straight line and generates vehicle information indicating that the change in ground clearance of the vehicle is large when the temporal changes exceed a threshold value.

4. The vehicle in claim 1, wherein the marker identifying information for identifying the corresponding magnetic marker is linked to the marker state information.

5. The vehicle in claim 1, wherein the marker state information is information based on a result of statistical process of a marker-detected count, which is a count of detections of each magnetic marker by any vehicle.

6. The vehicle in claim 5, the statistical process is performed for each road type with a same degree of a volume of traffic.

7. The vehicle in claim 1, including a history storage part which stores travel history data indicating a traveling route traveled by the vehicle and detection history data indicating a detection history of the magnetic marker, and
 wherein the computer processor identifies a magnetic marker on the traveling route indicated by the travel history data and performs process of comparing the magnetic marker on the traveling route and the magnetic marker included in the detection history indicated by the detection history data, and
 the computer processor determines a detection point representing a level of matching between the magnetic marker on the traveling route and the magnetic marker included in the detection history and performs a threshold process and determines that the magnetic sensor is normal when the detection point is equal to or larger than a threshold value and that the inspection of the magnetic sensor is required when the detection point is less than the threshold value.

8. The vehicle in claim 7, wherein the marker state information includes information indicating a quality level of the state of the magnetic marker, and
 in the process of comparing the magnetic marker on the traveling route and the magnetic marker included in the detection history indicated by the detection history data, in accordance with the quality level of the state of the magnetic marker, the computer processor varies degree of reflection onto an index for use in diagnosis of the magnetic sensor.

9. The vehicle in claim 1, wherein the computer processor diagnoses the state of the magnetic sensor by using the marker state information for a plurality of the magnetic markers.

10. A vehicular diagnostic system including a plurality of vehicles each including a magnetic sensor for detecting a plurality of magnetic markers disposed in a traveling road of the plurality of vehicles, the system comprising:
 a server apparatus which acquires detection information of the plurality of magnetic markers by each of the plurality of vehicles and, based on the detection information, generates marker state information indicating a state of each of the plurality of magnetic markers, and the plurality of vehicles each including:

a communication interface which acquires the marker state information from the server apparatus, wherein the quality information indicating the quality level of the each of the plurality of magnetic markers; and a computer processor configured to diagnose a state of the magnetic sensor including determining whether the magnetic sensor is normal or an inspection of the magnetic sensor is required, wherein the computer processor uses the marker state information to diagnose the state of the magnetic sensor;

a tag reader configured to perform wireless communication with a wireless tag held by the each of the plurality of magnetic markers and acquire marker identifying information for identifying a corresponding magnetic marker from the wireless tag, wherein the computer processor is configured to identify the marker state information of the corresponding magnetic marker by using the marker identifying information acquired from a magnetic marker side.

11. The vehicular diagnostic system in claim 10, wherein the detection information acquired by the server apparatus from a vehicle side includes at least the marker identifying information which uniquely identifies the corresponding magnetic marker.

12. The vehicular diagnostic system in claim 10, wherein the computer processor is configured to diagnose a change in ground clearance of the each of the plurality of vehicles in accordance with a change in mount height of the magnetic sensor of the each of the plurality of vehicles, wherein the marker state information includes information indicating a magnetic level of the each of the plurality of magnetic markers, and the computer processor performs diagnosis of detecting the change in ground clearance of the each of the plurality of vehicles by using an index value indicating a correlation between the magnetic level of the each of the plurality of magnetic markers included in the marker state information and a peak value of a magnetic measurement value measured by the magnetic sensor for the each of the plurality of magnetic markers, and the index value indicating the correlation is a gradient of an approximate straight line of the correlation, and the computer processor performs a threshold process regarding temporal changes of the gradient of the approximate straight line and generates vehicle information indicating that the change in ground clearance of each of the plurality of vehicles is large when the temporal changes exceed a threshold value.

13. The vehicular diagnostic system in claim 10, wherein marker identifying information for identifying a corresponding magnetic marker is linked to the marker state information, the each of the plurality of vehicles includes a tag reader which performs wireless communication with a wireless tag held by the each of the plurality of magnetic markers and acquires the marker identifying information for identifying the corresponding magnetic marker from the wireless tag, and the computer processor is configured to identify the marker state information of the corresponding magnetic marker by using the marker identifying information acquired from a magnetic marker side.

14. The vehicular diagnostic system in claim 10, wherein the marker state information is information based on a result of statistical process of a marker-detected count, which is a count of detections of the each of the plurality of magnetic markers by any of the plurality of vehicles.

15. The vehicular diagnostic system in claim 14, the statistical process is performed for each road type with a same degree of a volume of traffic.

16. The vehicular diagnostic system in claim 10, further comprising a history storage part which stores travel history data indicating a traveling route traveled by the each of the plurality of vehicles and detection history data indicating a detection history of the plurality of magnetic markers, and the computer processor identifies magnetic markers on the traveling route indicated by the travel history data and performs process of comparing the magnetic markers on the traveling route and the plurality of magnetic markers included in the detection history indicated by the detection history data, and the computer processor determines a detection point representing a level of matching between the magnetic markers on the traveling route and the plurality of magnetic markers included in the detection history and performs a threshold process and determines that the magnetic sensor is normal when the detection point is equal to or larger than a threshold value and that the inspection of the magnetic sensor is required when the detection point is less than the threshold value.

17. The vehicular diagnostic system in claim 16, wherein the marker state information includes information indicating quality levels of the state of the plurality of magnetic markers, and in the process of comparing the magnetic markers on the traveling route and the plurality of magnetic markers included in the detection history indicated by the detection history data, in accordance with the quality levels of the state of the plurality of magnetic markers, the computer processor varies degree of reflection onto an index for use in diagnosis of the magnetic sensor.

18. The vehicular diagnostic system in claim 10, wherein the server apparatus calculates a deviation value of marker-detected counts based on the detection information and performs threshold process regarding the deviation value.

19. The vehicular diagnostic system in claim 18 wherein the server apparatus determines that a possibility of trouble is high for a magnetic marker of the plurality of magnetic markers with the deviation value of the marker-detected counts below a predetermined threshold value.

20. The vehicular diagnostic system in claim 10, wherein the computer processor diagnoses the state of the magnetic sensor by using the marker state information for the plurality of magnetic markers.

* * * * *